United States Patent [19]
Ichino

[11] Patent Number: 5,867,746
[45] Date of Patent: Feb. 2, 1999

[54] FILM CARTRIDGE DETECTING APPARATUS

[75] Inventor: Kazushige Ichino, Tokyo, Japan

[73] Assignee: Canon Kabushiki Kaisha, Tokyo, Japan

[21] Appl. No.: 789,306

[22] Filed: Jan. 23, 1997

[30] Foreign Application Priority Data

Jan. 31, 1996 [JP] Japan .................................. 8-015335
Jan. 31, 1996 [JP] Japan .................................. 8-015465

[51] Int. Cl.⁶ .................................................. G03B 17/26
[52] U.S. Cl. .......................................... 396/538; 396/512
[58] Field of Search .................................. 396/512, 513, 396/516, 535, 538

[56] References Cited

U.S. PATENT DOCUMENTS

| | | | |
|---|---|---|---|
| 5,510,867 | 4/1996 | Wakabayashi | 396/538 |
| 5,521,661 | 5/1996 | Wakabayashi | 396/538 |
| 5,604,558 | 2/1997 | Kawakita | 396/538 |
| 5,612,760 | 3/1997 | Okuno | 396/538 |

FOREIGN PATENT DOCUMENTS

| | | | |
|---|---|---|---|
| 661587 A1 | 5/1995 | European Pat. Off. | G03B 17/30 |
| 704747 A2 | 4/1996 | European Pat. Off. | G03B 17/30 |

*Primary Examiner*—A. A. Mathews
*Attorney, Agent, or Firm*—Robin, Blecker & Daley

[57] ABSTRACT

An apparatus adapted to a film cartridge comprises an engaging portion which engages with the film cartridge being loaded into a cartridge chamber, a guiding portion which guides the engaging portion such that the engaging portion which has engaged with the film cartridge makes movement of at least one of rotation and sliding, and a switch which operates in response to the movement of the engaging portion.

14 Claims, 11 Drawing Sheets

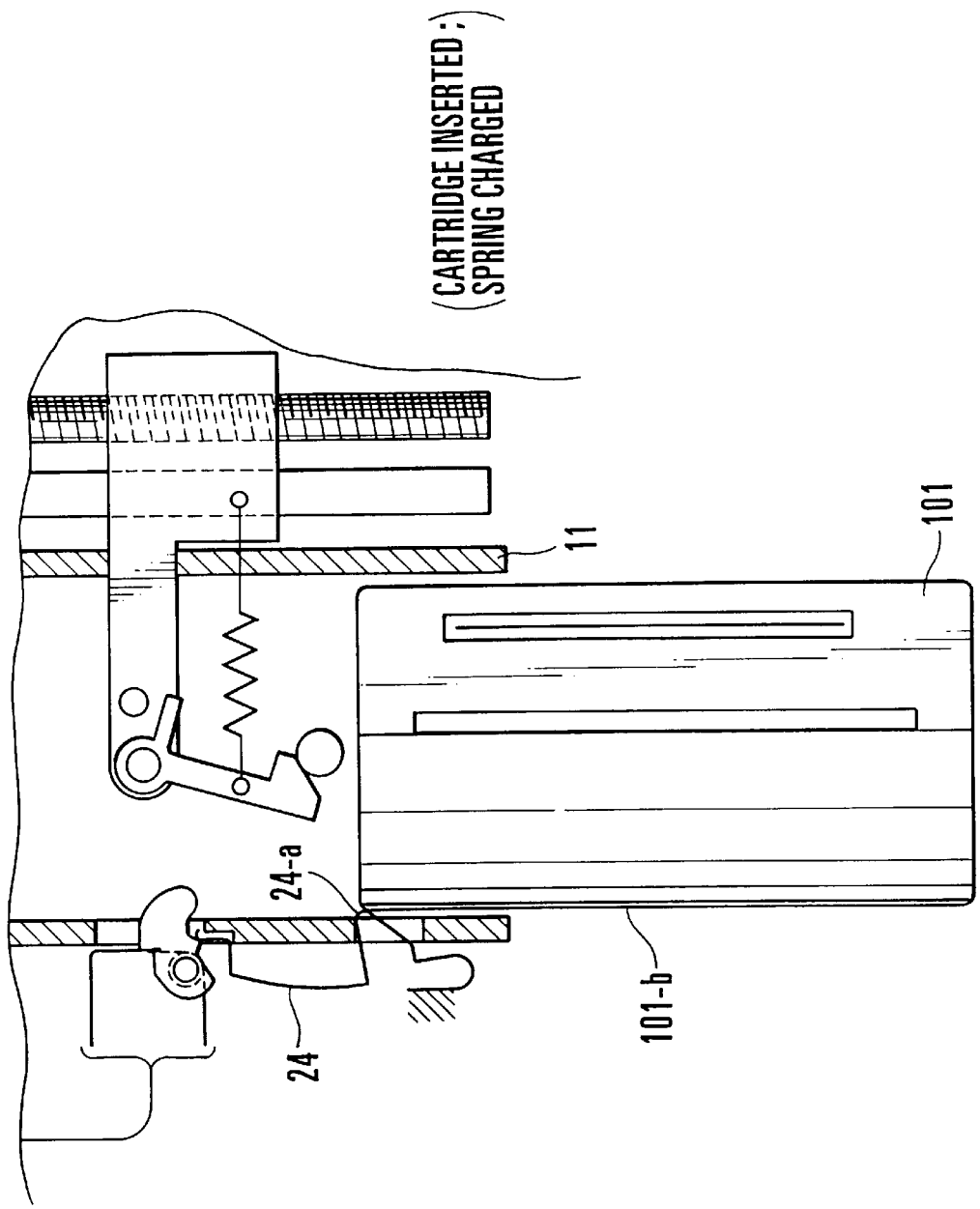

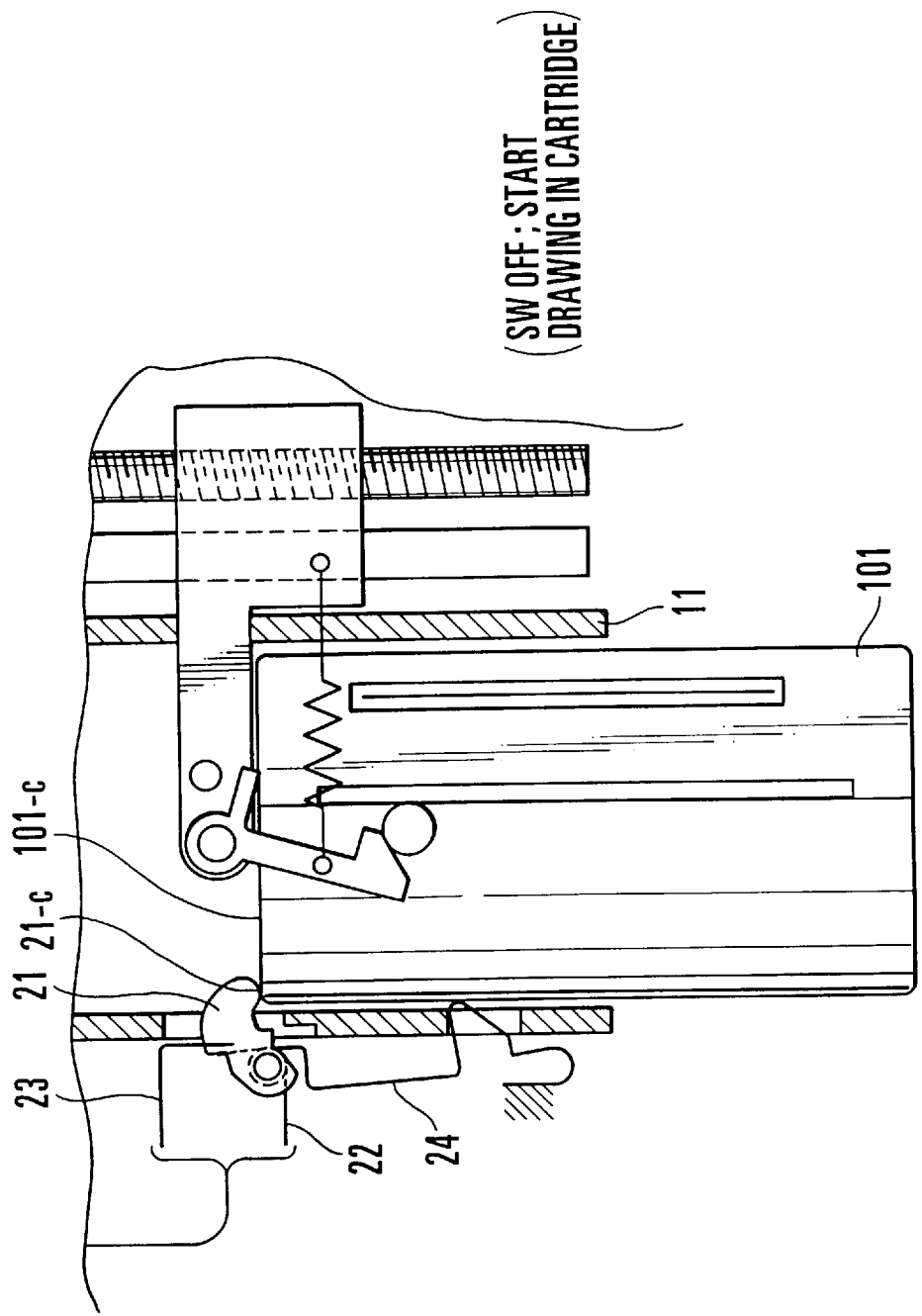

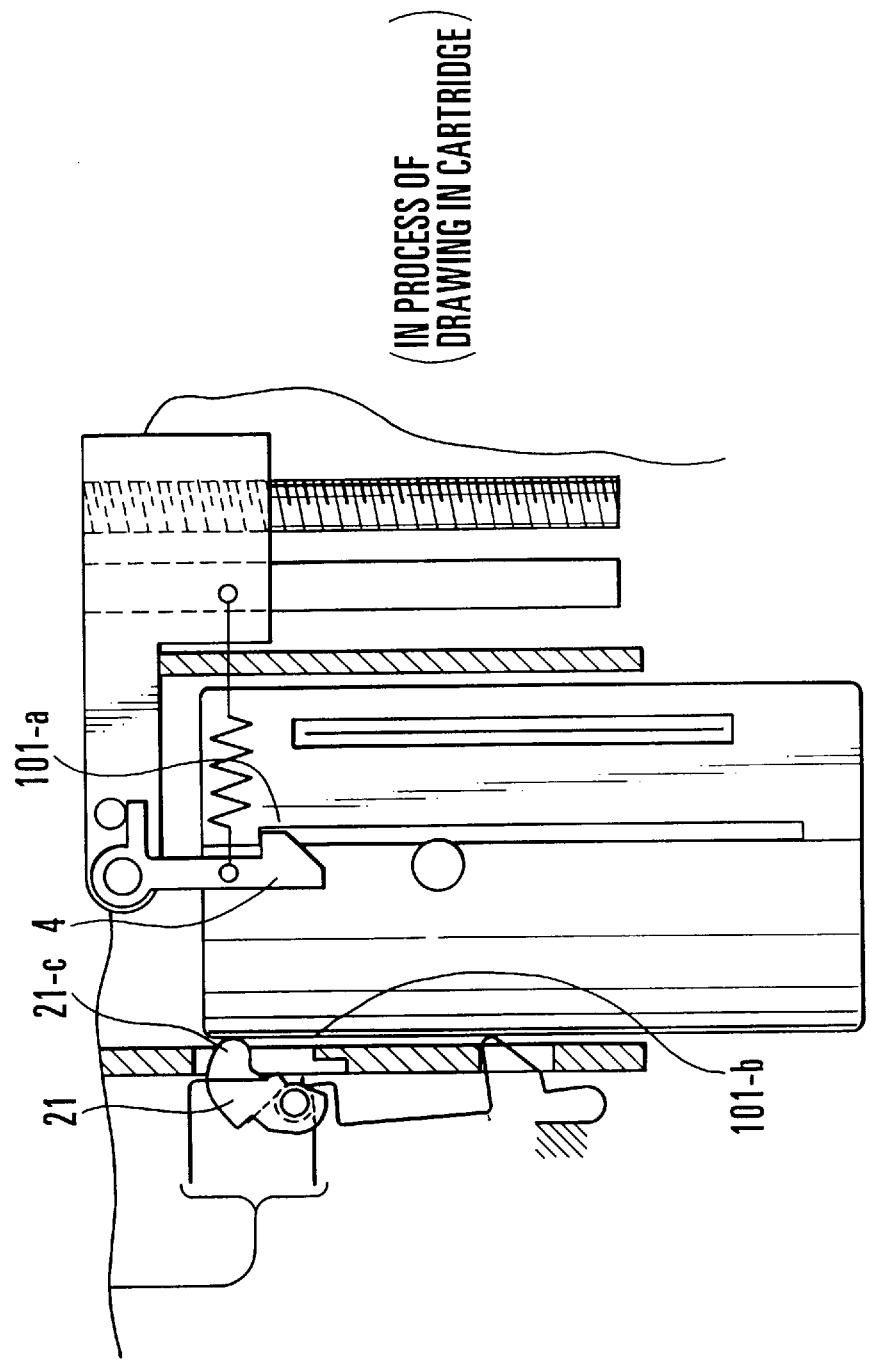

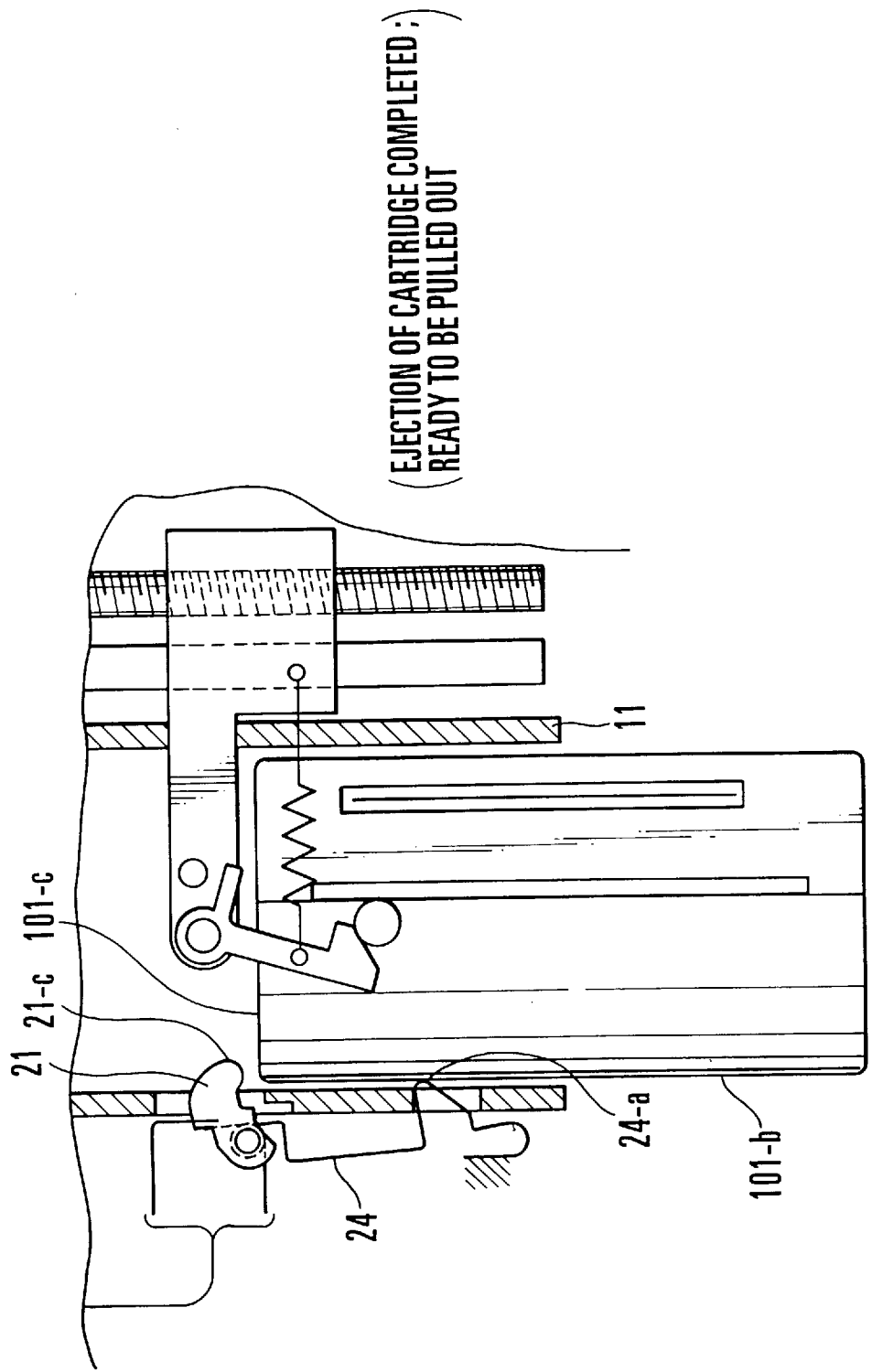

FILM CARTRIDGE DETECTING APPARATUS

BACKGROUND OF THE INVENTION

1. Field of the Invention

This invention relates to an arrangement for detecting a film cartridge being loaded into a cartridge chamber.

2. Description of Related Art

With regard to a film cartridge of a so-called thrust type having no leader part of film left outside of the film cartridge, an arrangement for detecting the position of the film cartridge relative to a cartridge chamber of a camera in automatically loading and ejecting the film cartridge into and from the cartridge chamber has been proposed in Japanese Patent Application No. HEI 7-135451.

According to the proposed arrangement, in automatically loading and ejecting the film cartridge into and from the camera, three positions, or states, of the film cartridge relative to the cartridge chamber must be detected in order to minimize the possibility of malfunctions of related mechanisms. The three positions or states are as follows.

(1) a position where the film cartridge has become loadable by an automatic loading mechanism (start of drawing-in), (2) a state in which the film cartridge has been completely loaded into the cartridge chamber by the automatic loading mechanism (completion of loading), and (3) a state in which the film cartridge has been ejected from the cartridge-chamber by an automatic ejecting mechanism and, then, the film cartridge has been completely pulled out by an operator (pulling-out).

In the case of Japanese Patent Application No. HEI 7-135451, two switches are used in combination as a means for detecting the three positions or states.

FIG. 10 shows the arrangement of a cartridge chamber proposed in the above Japanese Patent Application No. HEI 7-135451. In this arrangement, automatic loading and ejecting mechanisms are arranged to automatically load and eject a film cartridge 101, which is shown in FIG. 11, from the lower side of the camera by engaging with a recessed part 101-a of the film cartridge 101.

Referring to FIGS. 10 and 11, an engaging claw 104 which is urged to rotate by a spring 103 is pivotally supported for rotation by an ascending/descending member 102 and is arranged to engage with the recessed part 101-a of the film cartridge 101. The ascending/descending member 102 is arranged to be moved in the loading and ejecting directions jointly by an intermittent screw 105 which is not threaded in part near its drawing-in end, a support shaft 106 and a loading motor 107. A return spring 108 is arranged to aid the ascending/descending member 102 and the intermittent screw 105 for their screw engagement.

An opening-and-closing cover 109 is arranged to be opened and closed by an opening-and-closing motor 110. The opening-and-closing cover 109 is thus arranged to shield from light a cartridge chamber 111 which is arranged to accommodate the film cartridge 101. A film rewinding fork 112 is arranged to support the film cartridge 101 in conjunction with the opening-and-closing cover 109. The operations of these parts are controlled by a microcomputer 113.

An opening switch (SW1) 114 and a closing switch (SW2) 115 are arranged to detect the opening and closing of the opening-and-closing cover 109. An ejecting direction limit switch (SW3) 116 is arranged to detect the completion of an ejecting action of the ascending/descending member 102 on the film cartridge 101. A main switch (SW6) 119 is provided for opening and closing operations on the opening-and-closing cover 109.

The position (state) of the film cartridge 101 relative to the cartridge chamber 111 is detected by the combination of a loading drive start switch (SW1) 117 and a state detection switch (SW5) 118. More specifically, the microcomputer 113 determines the state (position) of the film cartridge 101 relative to the cartridge chamber 111 by the following combinations of states of the switches 117 (SW4) and 118 (SW5).

(SW4, SW5)=(off, off): a state in which the film cartridge has not yet been loaded or has been completely pulled out by the operator.

(SW4, SW5)=(off, on): a state in which the film cartridge is either in process of being pulled out by the operator or in process of being loaded. (SW4, SW5)=(on, on): a state in which the film cartridge is waiting for being pulled out by the operator after the completion of an automatic ejecting action, or a state in which an automatic loading drive is started after the completion of insertion by the operator.

(SW4, SW5)=(on, off): a state in which the film cartridge has been completely loaded.

However, the automatic loading and ejecting mechanisms arranged as described above have presented the following problems.

The switches for detecting whether or not the film cartridge has been inserted into the cartridge chamber by the operator to a position where the film cartridge has become able to be drawn in by the automatic loading mechanism are arranged to make such a detection by a side face 101-b of the film cartridge 101. In actuality, however, it is necessary to have some clearance between the film cartridge 101 and the cartridge chamber 111. The film-cartridge 101, therefore, might happen to irregularly move within a plane perpendicular to the loading direction inside the cartridge chamber 111. The irregular movement of the film cartridge 101 tends to incur inadequate contact of the switches which are of the contact type arranged to detect the side face 101-b of the film cartridge 101 as mentioned above. The automatic loading arrangement thus has the possibility of inadequate loading. Further, the arrangement using the engaging claw necessitates accurate detection of the inserted position of the film cartridge within the cartridge chamber in order to enable the engaging claw to engage with the film cartridge. However, unevenness in size among film cartridges tends to cause variations in timing of contact with the side face of the film cartridge. Under such a condition, the engaging claw might fail to engage with the film cartridge, thereby hindering adequate loading.

BRIEF SUMMARY OF THE INVENTION

In accordance with one aspect of this invention, there is provided an apparatus adapted to a film cartridge, which comprises an engaging portion which engages with the film cartridge being loaded into a cartridge chamber, a guiding portion which guides the engaging portion such that the engaging portion which has engaged with the film cartridge makes movement of at least one of rotation and sliding, and a switch which operates in response to the movement of the engaging portion, whereby a state of the film cartridge being loaded into the cartridge chamber can be detected accurately and reliably.

The above and other aspects and features of this invention will become apparent from the following detailed description of preferred embodiments thereof taken in conjunction with the accompanying drawings.

BRIEF DESCRIPTION OF THE SEVERAL VIEWS OF THE DRAWING

FIG. 3 is a diagram showing an operating state of the arrangement showing in FIG. 1.

FIG. 4 is a diagram showing an operating state of the arrangement showing in FIG. 1.

FIG. 5 is a diagram showing an operating state of the arrangement showing in FIG. 1.

FIG. 6 is a diagram showing an operating state of the arrangement showing in FIG. 1.

DETAILED DESCRIPTION OF THE INVENTION

Preferred embodiments of this invention will be described in detail below with reference to the drawings.

Figure 1:
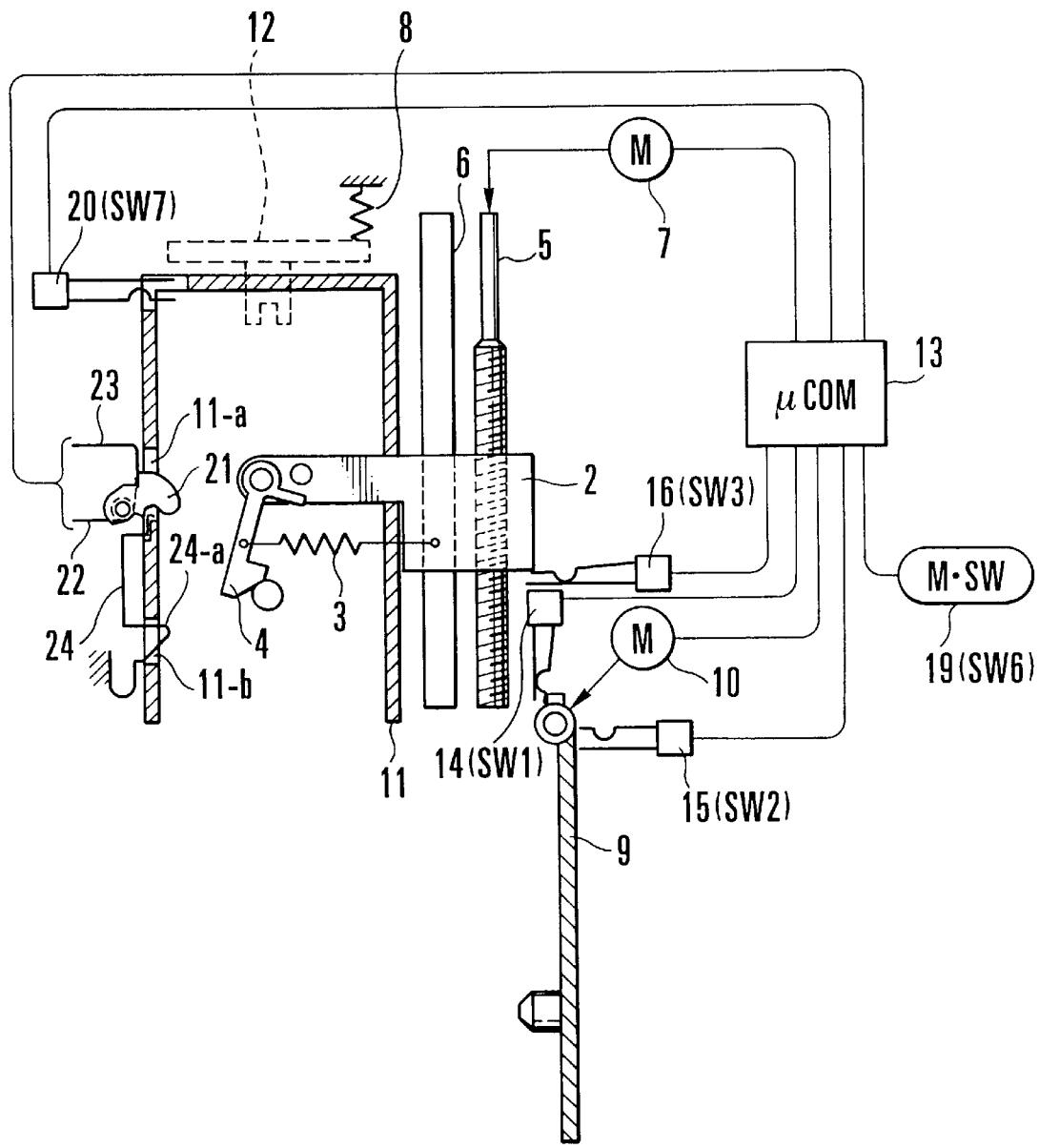
FIG. 1 is a schematic diagram showing the arrangement of a film cartridge chamber of a camera according to a first embodiment of this invention.
Figure 11:
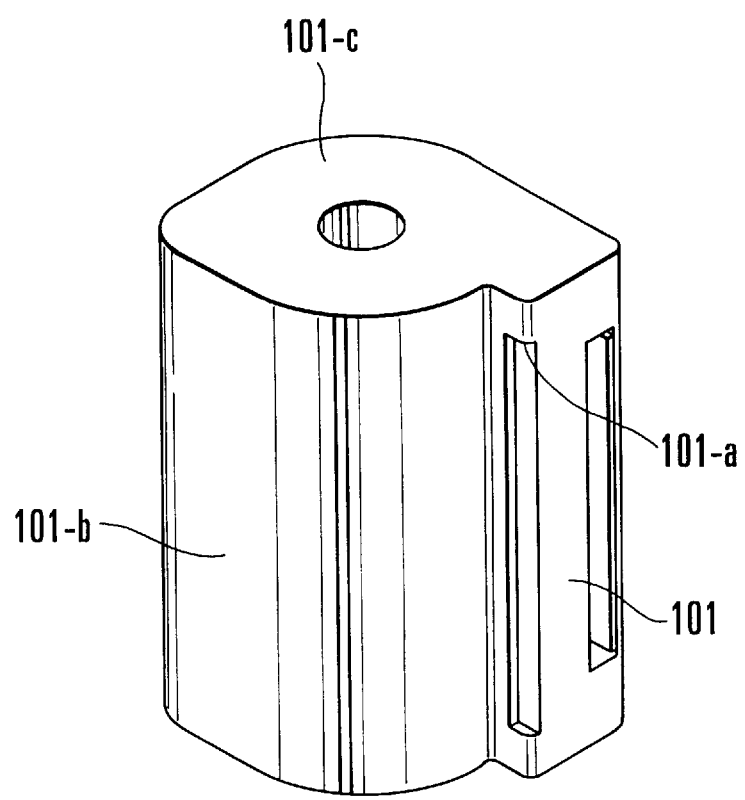
FIG. 11 is a perspective view showing the configuration of a film cartridge.

FIG. 1 is a schematic diagram showing the arrangement of a film cartridge chamber, which is of the type in which a film cartridge is loaded and ejected from the lower side, of a camera according to a first embodiment of this invention. Referring to FIG. 1, a loading completion switch (SW7) 20 is disposed on an upper end face of a cartridge chamber 11 so as to detect the completion of loading of a film cartridge 101 by detecting an upper surface 101-c of the film cartridge 101 shown in FIG. 11. The switch 20 is arranged independently solely for detecting the completion of the cartridge loading process.

Figures 2A, 2B:
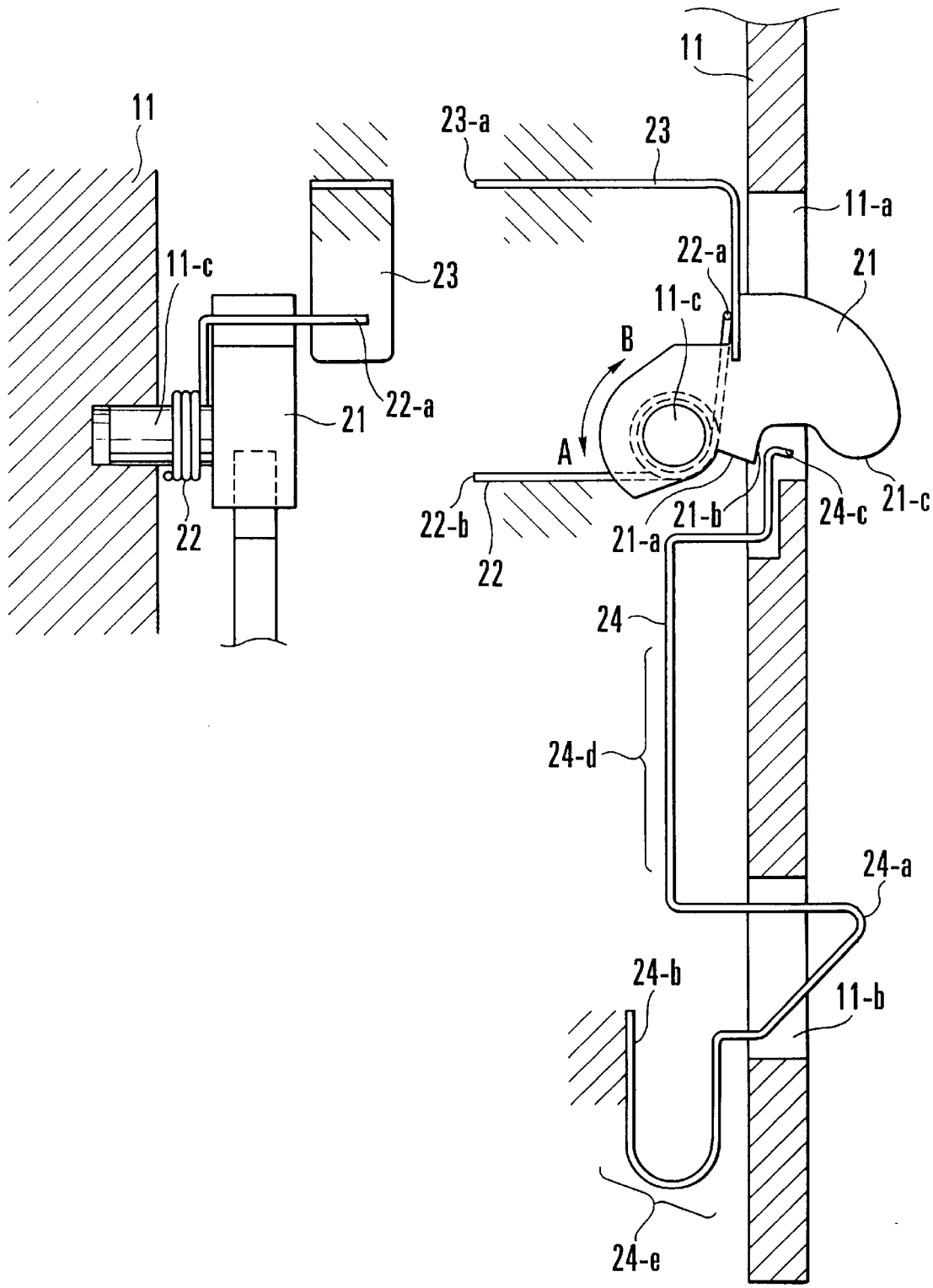
FIGS. 2(a) and 2(b) are enlarged views showing in part the arrangement shown in FIG. 1.

A group of switches are disposed on a side face and near an entrance part of the cartridge chamber 11 so as to detect the start of drawing-in of the film cartridge 101 and the pulling-out of the film cartridge 101, as shown in detail in FIG. 2(a) which is a partial enlarged side view and in FIG. 2(b) which is a partial enlarged front view.

Referring to FIGS. 2(a) and 2(b) in addition to FIG. 1, a hole 11-a is provided in one side wall of the cartridge chamber 11. A detection lever 21 made of a rigid material protrudes from the hole 11-a. The detection lever 21 is supported for rotation (in directions of arrows A and B) by a shaft 11-c which is secured to the side wall of the cartridge chamber 11. A torsion contact 22 which is a torsion spring is arranged to urge the detection lever 21 to rotate in the direction of the arrow B. The rotation of the detection lever 21 in the direction of the arrow B is restricted by a fore end 22-a of the torsion contact 22 coming in contact with a contact plate 23. Each of the torsion contact 22 and the contact plate 23 is made of a conductive material. The rotating state of the detection lever 21 can be detected by detecting the conductive state between an end part 22-b of the torsion contact 22 and an end part 23-a of the contact plate 23. In FIG. 2(b), there is shown the detection lever 21 in a state of having completely been rotated in the direction of the arrow B.

Further, a delay spring 24 made of an elastic material in a shape as shown in FIG. 2(b) has a part (contact part 24-a) protruding from a hole 11-b provided in the side wall of the cartridge chamber 11 near its entrance. A fixing part 24-b of the delay spring 24 is fixed to a camera body (not shown). A fore end of the delay spring 24 is formed as an abutting part 24-c. In a state which will be described later herein, an engaging part 21-a of the detection lever 21 abuts on the abutting part 24-c, which then acts to prevent the detection lever 21 from rotating further in the direction of the arrow B.

With the embodiment configured in the above-stated manner, actions to be performed in detecting the start of drawing-in of the film cartridge 101 and the pulling-out of the film cartridge 101 are next described with reference to FIGS. 3 to 6.

Figure 7:
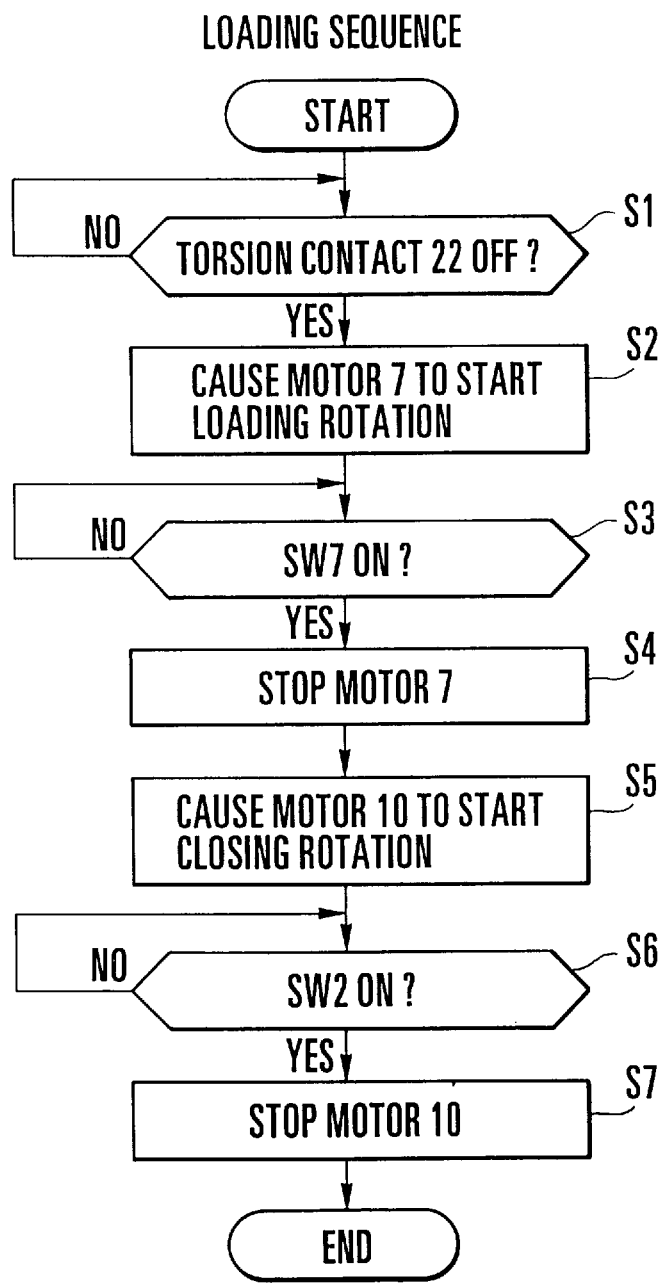
FIG. 7 is a flow chart showing a flow of operation of a microcomputer 13 shown in FIG. 1.

A loading operation in the first embodiment is first described below with reference to FIG. 7 which is a flow chart showing a flow of operation of a microcomputer 13. The flow of operation begins with the opening-and-closing cover 9 in its open state.

(i) Insertion of the film cartridge (FIG. 3).

When the film cartridge 101 is inserted to a certain extent into the entrance of the cartridge chamber 11 by the operator, the contact part 24-a of the delay spring 24 is pushed by the side face 101-b of the film cartridge 101. The abutting part 24-c of the delay spring 24 then comes to abut on a charging part 21-b of aid the detection lever 21, so that the delay spring 24 is deformed as shown in FIG. 3. In this instance, the deformed parts of the delay spring 24 are identified as a first deformed part 24-d and a second deformed part 24-e.

(ii) Start of drawing-in of the film cartridge (FIG. 4).

When the film cartridge 101 is pushed further into the cartridge chamber 11 by the operator, the upper face 101-c of the film cartridge 101 pushes a detecting part 21-c of the detection lever 21 to cause the detection lever 21 to rotate in the direction of the arrow A. At the same time, the fore end 22-a of the torsion contact 22 parts from the contact plate 23, thereby cutting off the conductive state therebetween. In this state, at a step S1, the microcomputer 13 determines that the film cartridge 101 has been inserted to a loadable position in the cartridge chamber 11. At a step S2, the microcomputer 13 causes the loading motor 7 to be driven. Further, in accordance with the rotation of the detection lever 21, the abutting part 24-c of the delay spring 24 comes into below the engaging part 21-a of the detection lever 21, thereby releasing the first deformed part 24-d from a deformed state.

The use of the rotatable detection lever 21 to detect the upper face 101-c (a plane orthogonal to the cartridge loading direction)of the film cartridge 101 enables the camera to accurately and directly detect the inserted position of the film cartridge 101, taking no heed of variations in size of the film cartridge 101 and its irregular movement within the cartridge chamber 11.

(iii) In process of drawing in the film cartridge (FIG. 5).

When the film cartridge 101 begins to be drawn in with an engaging claw 4 coming to engage with the recessed part 101-a of the film cartridge 101, the detection lever 21 rotates further in the direction of the arrow A. The detecting part 21-c of the detection lever 21 eventually comes to a position along the side face 101-b of the film cartridge 101. Incidentally, if the detection lever 21 has the same arrangement as a loading completion switch (SW7) 20 which detects the upper face 101-c of the film cartridge 101, the detection lever 21 would stretch to prevent any further insertion of the film cartridge 101 after the upper face 101-c is detected.

At a step S3, when the loading completion switch (SW7) 20 is found to have been turned on with the film cartridge 101 completely drawn in the cartridge chamber 11, the flow proceeds to a step S4. At the step S4, the loading motor 7 is caused to stop rotating. At steps S5, S6 and S7, an opening-and-closing motor 10 is caused to be driven in a direction to close the opening-and-closing cover 9 until a switch (SW2) 15 is turned, so that the opening-and-closing cover 9 is closed.

Next, an ejecting operation to be executed before the film cartridge 101 is manually pulled out is described below with reference to FIG. 8 which is a flow chart of operation of the microcomputer 13.

Figure 8:
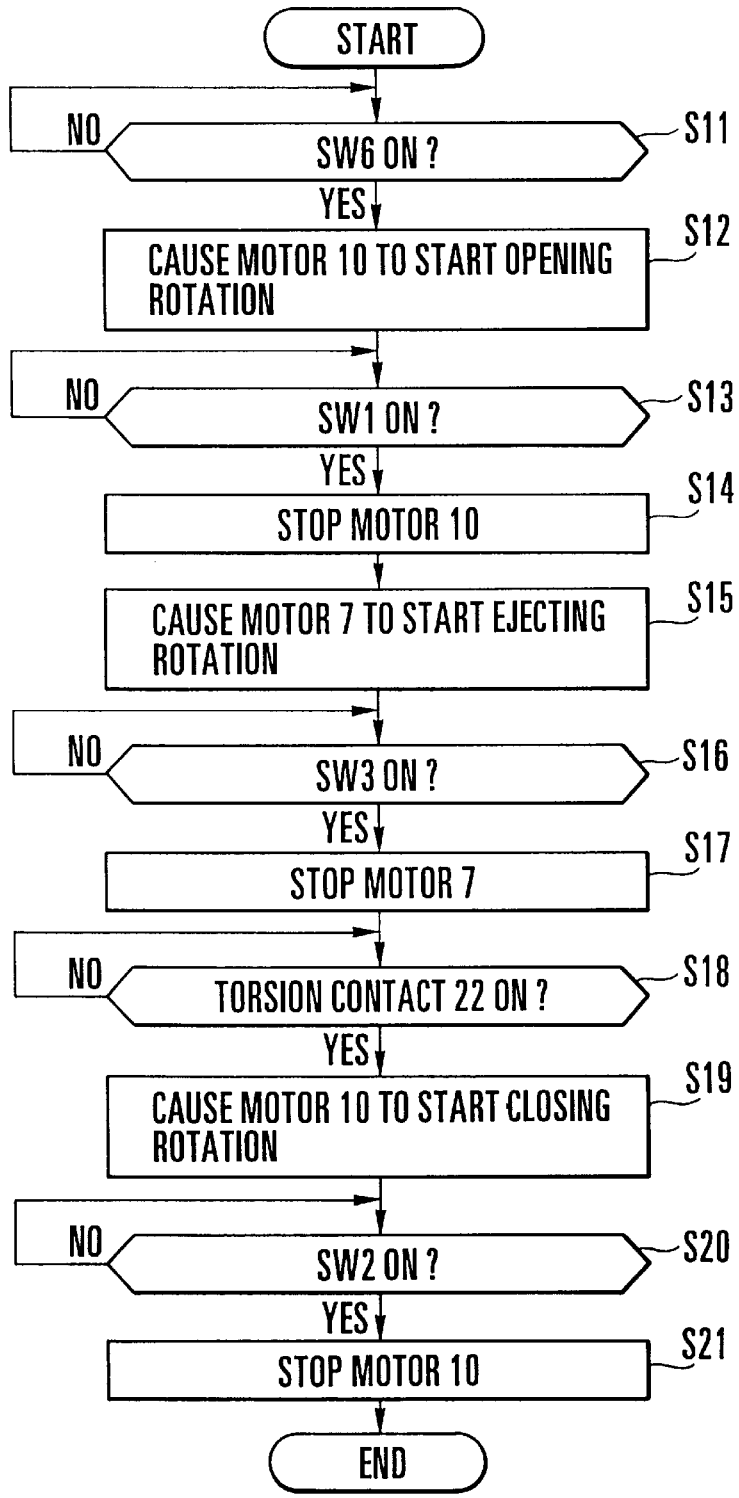
FIG. 8 is a flow chart showing another flow of operation of the microcomputer 13 shown in FIG. 1.

Steps S11 to S17 shown in FIG. 8 relate to a flow of automatic film cartridge ejecting processes.

At a step S11, when the operator pushes a main switch (SW16) 19 to eject the film cartridge 101, steps S12, S13 and S14 are executed to drive the opening-and-closing motor 10 in a direction to open the opening-and-closing cover 9 until a switch (SW1) 14 is turned on, so that the opening-and-closing cover 9 is opened. Then, steps S15, S16 and S17 are executed to drive the loading motor 7 to move the ascending/descending member 2 in a direction to eject the film cartridge 101 until an ejecting direction limit switch (SW3) 16 is turned.

(iv) State ready for pulling out the film cartridge (FIG. 6).

The flow of process for automatically ejecting the film cartridge 101 comes to an end by pushing the upper face 101-c of the film cartridge 101 by the ascending/descending member 2. However, the film cartridge 101 must be eventually pulled out by the operator. In the state shown in FIG. 6, the film cartridge 101 has been pulled a little out of the cartridge chamber 11 but not completely out of the entrance of the cartridge chamber 11. The detecting part 21-c of the detection lever 21 which has been in contact with the side face 101-b of the film cartridge 101 is liberated from the side face 101-b when the film cartridge 101 is pulled out. After the liberation, the detection lever 21 tries to move back in the direction of the arrow B by the spring force of the torsion contact 22. The detection lever 21 is, however, prevented from fully rotating in the direction of the arrow B since the engaging part 21-a of the detection lever 21 abuts on the abutting part 24-c of the delay spring 24. Therefore, in this state, the conductive state between the torsion contact 22 and the contact plate 23 has not been regained as yet.

At a step S18, when the film cartridge 101 is completely pulled out from the cartridge chamber 11, the contact part 24-a of the delay spring 24 which has been in contact with the side face 101-b of the film cartridge 101 is liberated to release the second deformed part 24-e from a deformed state. The abutting part 24-c of the delay spring 24 then disengages from the engaging part 21-a of the detection lever 21. As a result, the detection lever 21 resumes the state shown in FIG. 2. Then, the conductive state between the torsion contact 22 and the contact plate 23 is made, so that the microcomputer 13 determines that the film cartridge 101 has been completely pulled out by the operator.

With the arrangement as described above, the rotating motion of the detection lever 21 (switching of the conductive state between the torsion contact 22 and the contact plate 23) is controlled by detecting whether or not the delay spring 24 is deformed. In other words, if the delay spring 24 is arranged to have a sufficient amount of deformation, the pulled-out state of the film cartridge 101 can be detected without fail irrespective of unevenness in size of the film cartridge 101.

At steps S19, S20 and S21, the opening-and-closing motor 10 is driven in a direction to close the opening-and-closing cover 9 until the switch (SW2) 15 is turned on, so that the opening-and-closing cover 9 is closed. The flow then comes to an end.

In the first embodiment described above, one and the same switch is arranged to have such a hysteresis that the switch is turned on and off when the film cartridge 101 comes to different inserted states. The arrangement enables the embodiment to detect three different states through two switches, instead of the method of detecting the states of a film cartridge by the combinations of switches as previously proposed.

Figure 9:
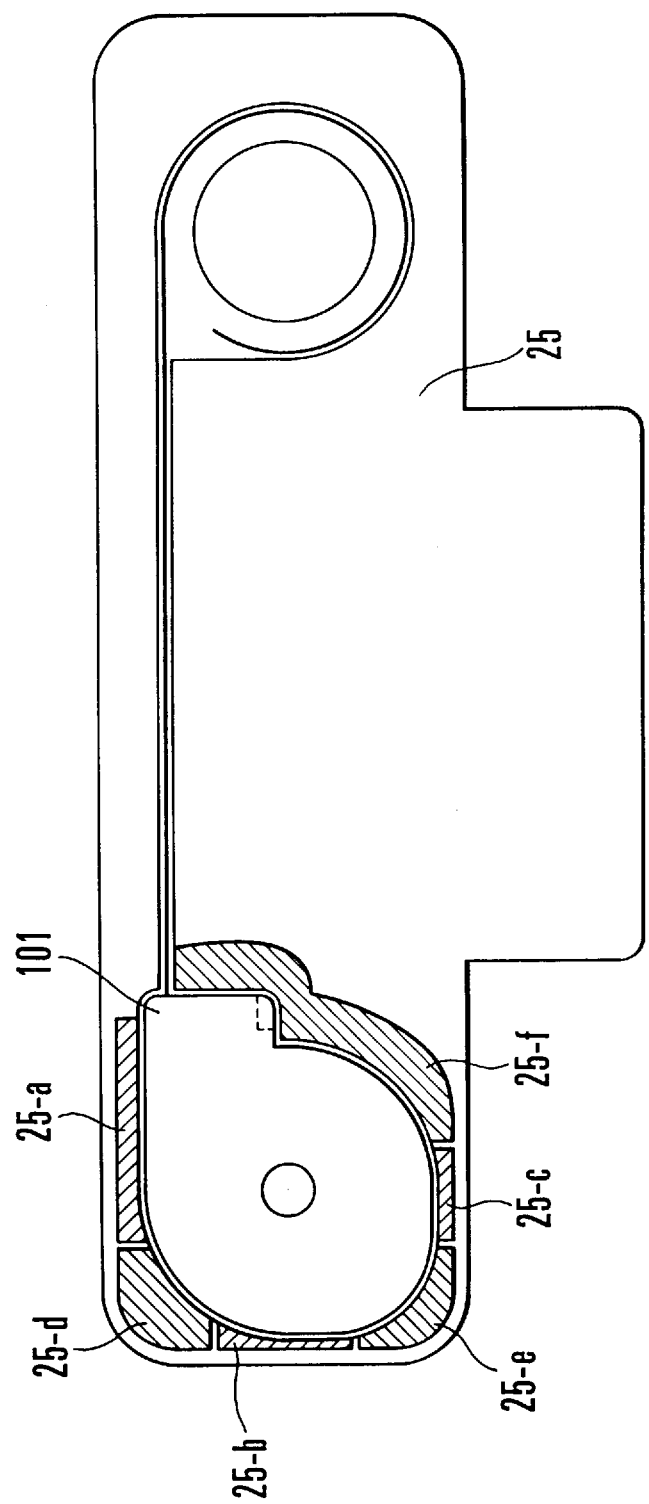
FIG. 9 is a horizontal sectional view showing a camera according to a second embodiment of this invention.
Figure 10:
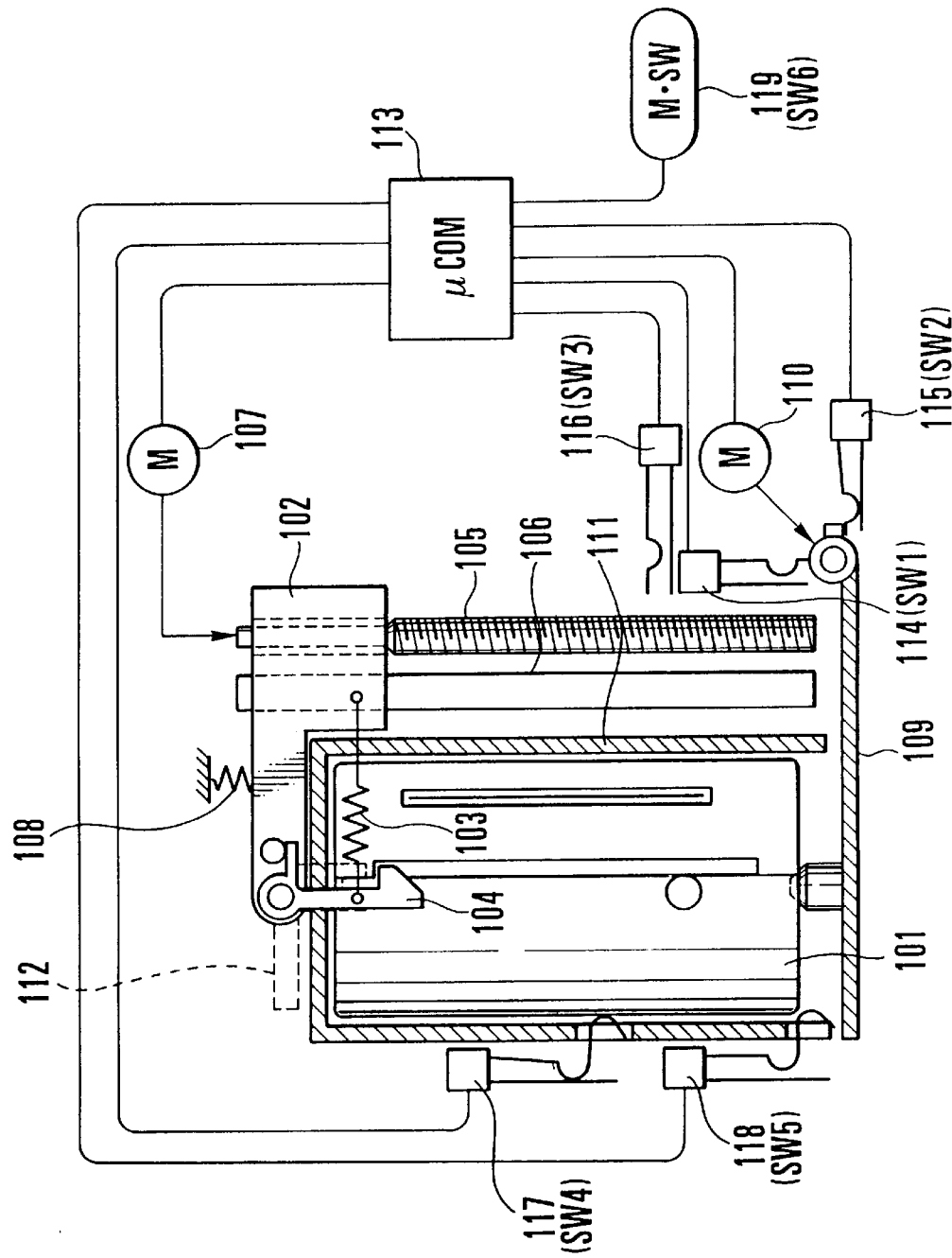
FIG. 10 is a schematic diagram showing the arrangement of a film cartridge chamber of a camera as previously proposed.

FIG. 9 is a horizontal sectional view taken across a middle part of a camera 25 according to a second embodiment of this invention.

In FIG. 9, parts arranged in the same manner as the corresponding parts of the first embodiment are indicated by the same reference numerals as the numerals used in the first embodiment.

Referring to FIG. 9, a means for detecting the positions (states) of the film cartridge 101 can be disposed in the areas 25-a to 25-f surrounding the film cartridge 101. However, in order to minimize the size of areas around the cartridge chamber, the front, rear and side areas 25-a, 25-b and 25-c are used only for light-shielding walls forming the cartridge chamber. The area 25-f located on the inner side accommodates various mechanisms and elements necessary for the camera 25, so that if the position detecting means is disposed there, it would cause an increase in size of the camera 25. Incidentally, the loading completion switch (SW7) 20, which is disposed above the upper face of the cartridge chamber 11, does not directly cause any increase in size of the camera 25.

Considering the switch arrangement of the first embodiment described above, it is natural to have the switch parts of varied kinds including the detection lever 21, the delay spring 24, etc., except the loading completion switch (SW7) 20, disposed in parallel with the direction of loading the film cartridge 101. In the case of a camera 25 according to the second embodiment, therefore, switch parts such as a film cartridge detecting part, parts for fixing to the camera body, wiring for the microcomputer 13, etc., are disposed within angular parts of the camera 25, including the area 25-d which is surrounded by a side face and a rear face of the camera 25 and the film cartridge 101 and the area 25-e which is surrounded by the side face and a front face of the camera 25 and the film cartridge 101. Within these areas 25-d and 25-e, all the parts mentioned above can be arranged by using the full vertical length of the cartridge chamber without causing any increase in size of the camera 25.

According to the arrangement of each of the embodiments described above, a camera or a film cartridge detecting apparatus can be arranged to be capable of accurately detecting without fail the state of a film cartridge being loaded into a cartridge chamber of the camera.

Further, a camera or a film cartridge detecting apparatus which is capable of appositely detecting the state of a film cartridge being loaded into a cartridge chamber can be simply arranged at a low cost.

The individual components shown in schematic or block form in the drawings are all well known in the camera arts and their specific construction and operation are not critical to the operation or best mode for carrying out the invention.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

For example, while the detection lever 21 is arranged to rotate in each of the embodiments described above, the detection lever 21 may be arranged to move in a different manner. For example, the detection lever 21 may be arranged, in accordance with this invention, to slide or to rotate and slide.

This invention applies also to a cartridge of a type other than the type described in the foregoing or to a cartridge containing an image recording medium other than a film. Further, this invention is applicable to cartridges of different kinds or to various matters to be used by loading them on apparatuses, such as a battery or the like.

This invention is applicable to detection to be made at a place other than a film cartridge chamber.

This invention may be carried out by combining as necessary the embodiments or their technological elements described in the foregoing.

This invention applies to various cases where either the whole or a part of claims or the arrangement of each embodiment described forms one apparatus or is used in combination with some other apparatus or as a component element of an apparatus.

Further, this invention is applicable to cameras of varied kinds, such as a single-lens reflex camera, a lens-shutter type camera, a video camera, etc., optical apparatuses other than cameras, devices adapted for cameras, optical apparatuses and other apparatuses, and component elements forming these apparatuses and devices.

I claim:

1. An apparatus adapted to a film cartridge, comprising:
    a) an engaging portion which engages with the film cartridge being loaded into a cartridge chamber;
    b) a guiding portion which guides said engaging portion such that said engaging portion which has engaged with the film cartridge makes movement of at least one of rotation and sliding; and
    c) a switch which operates in response to the movement of said engaging portion and changes state at respective different positions of said cartridge relative to said cartridge chamber.

2. An apparatus according to claim 1, wherein said engaging portion is formed of a rigid material.

3. An apparatus according to claim 1, wherein said engaging portion is so formed as to engage with a bottom face of the film cartridge.

4. An apparatus according to claim 1, wherein said engaging portion is arranged in a corner of the cartridge chamber on a side of said apparatus.

5. An apparatus according to claim 1, wherein said apparatus includes a camera.

6. An apparatus adapted to a film cartridge, comprising:
    a) a first engaging portion which moves to a first position by engaging with the film cartridge being loaded into a cartridge chamber;
    b) a second engaging portion which moves to a second position by engaging with the film cartridge being loaded into the cartridge chamber;
    c) a switch which changes a state thereof by said second engaging portion moving to the second position; and
    d) a holding portion which holds said second engaging portion at the second position as long as the film cartridge is engaging with said first engaging portion even after the film cartridge comes into such a state as not to engage with said second engaging portion.

7. An apparatus according to claim 6, wherein said first engaging portion and said second engaging portion are disposed such that, when the film cartridge is loaded into the cartridge chamber, the film cartridge engages with said second engaging portion after engaging with said first engaging portion.

8. An apparatus according to claim 6, wherein said first and second engaging portions include first and second elastic members, respectively, for returning said first and second engaging portions to respective initial positions thereof.

9. An apparatus according to claim 8, wherein said holding portion includes a preventing portion which prevents said second elastic member from returning said second engaging portion to the initial position thereof.

10. An apparatus according to claim 9, wherein said holding portion is arranged to cancel said preventing portion from preventing said second elastic member from returning said second engaging portion to the initial position thereof, in response to said first engaging portion returning the initial position thereof by said first elastic member.

11. An apparatus according to claim 6, wherein said first and second engaging portions are arranged in a corner of the cartridge chamber on a side of said apparatus.

12. An apparatus according to claim 6, wherein said apparatus includes a camera.

13. An apparatus adapted to a image recording medium cartridge, comprising:
    a) an engaging portion which engages with the image recording medium cartridge being loaded into a cartridge chamber;
    b) a guiding portion which guides said engaging portion such that said engaging portion which has engaged with the image recording medium cartridge makes movement of at least one of rotation and sliding; and
    c) a switch which operates in response to the movement of said engaging portion and changes state at respective different positions of said cartridge relative to said cartridge chamber.

14. An apparatus adapted to an image recording medium cartridge, comprising:
    a) a first engaging portion which moves to a first position by engaging with the image recording medium cartridge being loaded into a cartridge chamber;
    b) a second engaging portion which moves to a second position by engaging with the image recording medium cartridge being loaded into the cartridge chamber;
    c) a switch which changes a state thereof by said second engaging portion moving to the second position; and
    d) a holding portion which holds said second engaging portion at the second position as long as the image recording medium cartridge is engaging with said first engaging portion even after the image recording medium cartridge comes into such a state as not to engage with said second engaging portion.

* * * * *

UNITED STATES PATENT AND TRADEMARK OFFICE
CERTIFICATE OF CORRECTION

PATENT NO. : 5,867,746
DATED : February 2, 1999
INVENTOR(S) : Kazushige Ichino

It is certified that error appears in the above-identified patent and that said Letters Patent are hereby corrected as shown below:

Col. 2, line 7, delete "SW1" and insert -- SW4 --.
Col. 8, line 36, delete "a" and insert -- an --.

Signed and Sealed this

Eleventh Day of January, 2000

Attest:

Attesting Officer

Q. TODD DICKINSON

Acting Commissioner of Patents and Trademarks